United States Patent
Lee et al.

(10) Patent No.: US 7,525,607 B2
(45) Date of Patent: Apr. 28, 2009

(54) LCD DEVICE FOR REMOVING STATIC ELECTRICITY HAVING FIRST AND SECOND COMMON LINES INTERCONNECTED WITH A THIRD COMMON LINE THROUGH A PROTECTION DIODE MEANS AT THE FIRST COMMON LINE END AND A CONDUCTIVE MEANS AT THE SECOND COMMON LINE END

(75) Inventors: Deok Won Lee, Seongnam-si (KR); Kyoung Moo Lee, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 339 days.

(21) Appl. No.: 11/167,621

(22) Filed: Jun. 27, 2005

(65) Prior Publication Data
US 2006/0001787 A1   Jan. 5, 2006

(30) Foreign Application Priority Data
Jun. 30, 2004   (KR) .................... 10-2004-0049979

(51) Int. Cl.
*G02F 1/1333*   (2006.01)
(52) U.S. Cl. ........................................ 349/40
(58) Field of Classification Search ............ 349/40
See application file for complete search history.

(56) References Cited

U.S. PATENT DOCUMENTS

| 5,930,607 | A | * | 7/1999 | Satou | 438/158 |
| 6,008,877 | A | * | 12/1999 | Akiyama et al. | 349/147 |
| 6,639,633 | B2 | * | 10/2003 | Song et al. | 349/40 |
| 2003/0128308 | A1 | * | 7/2003 | Kim | 349/58 |

* cited by examiner

*Primary Examiner*—David Nelms
*Assistant Examiner*—John Heyman
(74) *Attorney, Agent, or Firm*—Brinks Hofer Gilson & Lione

(57) ABSTRACT

An LCD display cable of removing a residual direct current is disclosed. The LCD includes an LC panel for displaying an image, a first and a second common electrode line, a third common electrode line, gate lines, and data lines. The first and second common electrode lines are vertically arranged at left and right of the LC panel. The third common electrode line is connected between the first and second common electrode lines. The gate lines are arranged in parallel with the third common electrode line. The data lines are arranged perpendicularly to the third common electrode line. The third common electrode line has a static electricity protection pattern formed on one side thereof and a predetermined conductive pattern or a predetermined metal pattern formed on the other side thereof. The predetermined conductive pattern or predetermined metal pattern eliminate the residual direct current.

39 Claims, 3 Drawing Sheets

LCD DEVICE FOR REMOVING STATIC ELECTRICITY HAVING FIRST AND SECOND COMMON LINES INTERCONNECTED WITH A THIRD COMMON LINE THROUGH A PROTECTION DIODE MEANS AT THE FIRST COMMON LINE END AND A CONDUCTIVE MEANS AT THE SECOND COMMON LINE END

The present invention claims the benefit of Korean Patent Application No. 49979/2004, filed in Korea on Jun. 30, 2004, which is hereby incorporated by reference.

BACKGROUND OF THE INVENTION

1. Field of the Invention

The present invention relates to a liquid crystal display device (LCD), and more particularly, to an LCD capable of removing a residual direct current (DC).

2. Description of the Related Art

An LCD is a flat display for displaying an image by controlling a transmitted amount of a light beam in response to an image signal. Particularly, since the LCD is characteristically lightweight, slim, and has low power consumption, the application field of the LCD is gradually expanding.

The LCD includes a liquid crystal (LC) panel for displaying an image, gate drivers for applying gate signals to the gate lines of the LC panel, and data drivers for applying data signals to the data lines of the LC panel. Currently, the gate drivers and the data drivers operate under control of a timing controller.

The LC panel includes an array substrate having thin film transistors (TFTs) thereon, a color filter substrate having a color filter thereon, and an LC layer interposed between the two substrates.

Referring to FIG. 1, the array substrate includes gate lines 1 arranged in the first direction and data lines 2 arranged in the second direction perpendicular to the first direction and perpendicular to the gate lines. At this point, a pixel region is defined by the gate lines 1 and the data lines 2.

A thin film transistor (TFT) serving as a switching device is connected with each of the gate lines 1 and the data lines 2. That is, a gate electrode of the TFT is connected with each of the gate lines 1 and a source electrode of the TFT is connected with each of the data lines 2. Further, a drain electrode of the TFT is connected with a pixel electrode.

A common electrode can be provided on the array substrate or the color filter substrate depending on the LC mode of the LC layer. That is, in the case of a twisted nematic (TN) mode, the common electrode is provided on the color filter substrate. Accordingly, the common electrode can have a plane shape. In that case, when a predetermined voltage is applied to the pixel electrode and the common electrode, a predetermined vertical electric field is generated between the pixel electrode formed on the array substrate and the common electrode formed on the color filter substrate. The LC is driven by the vertical electric field to display an image.

In the TN mode LCD, the displacement width of the LC is limited and the viewing angle is narrow. On the contrary, in the case of an in-plane switching (IPS) mode, the common electrode is provided on the array substrate together with the pixel electrode. The common electrode can have a line shape and be disposed in parallel with the gate line 1. Pixel electrode bars, which are in parallel with the data lines 2, are arranged in the pixel electrode. Common electrode bars alternately arranged relative to the pixel electrode bars are arranged in the common electrode. In that case, when a predetermined voltage is applied to the pixel electrode and the common electrode, a horizontal electric field (or transverse electric field) is generated between the pixel electrode bars and the common electrode bars. The LC is driven by this horizontal electric field to display an image. In the IPS-mode LCD, the displacement width of the LC is almost not limited and thus the viewing angle is wide.

In the meantime, common electrode lines 3, 4, and 5 for allowing a common voltage provide from the outside to be supplied to the common electrode are arranged along the edge of the LC panel. That is, the first common electrode line 3 is disposed at the left edge of the LC panel, the second common electrode line 4 is disposed at the right edge of the LC panel, and the third common electrode line 5 is disposed at the upper edge of the LC panel. The third common electrode line 5 is connected between the first common electrode line 3 and the second common electrode line 4. A ground line 16 for grounding is disposed at the lower side between the first and second common electrode lines 3 and 4 extending to the lower side of the left/right edge of the LC panel.

In the case where the common electrode lines 3, 4, and 5 are arranged as described above, the gate lines 1 arranged within the LC panel are connected with the first common electrode line 3 with the first static electricity protection pattern 6 interposed. The gate lines 1 would also be connected with the second common electrode line 4 with the second static electricity protection pattern 7 interposed. The third and fourth static electricity protection patterns 8 and 9 are provided to left and right of the third common electrode line 5, respectively. Also, the fifth static electricity protection pattern 10 is provided to each point between the third common electrode line 5 and the data lines 2. Here, the static electricity protection patterns 6, 7, 8, 9, and 10 prevent the inside of the device from being damaged due to electrostatic discharge (ESD). The static electricity protection patterns 6, 7, 8, 9, and 10 can consist of a transistor having a diode function that allows a current to flow in one direction only. That is, the static electricity protection patterns 6, 7, 8, 9, and 10 swiftly emit static electricity generated in the inside of the LC panel to the outside and prevent static electricity generated at the outside from flowing into the inside of the LC panel. Accordingly, thanks to the static electricity protection patterns 6, 7, 8, 9, and 10, the TFT or the pixel electrode provided within the LC panel are safely protected.

In the meantime, when the IPS-mode LCD operates, a residual direct current (DC) appears along the third common electrode line on the upper side and an afterimage or a flicker is generated by this residual DC, which deteriorates image quality.

In the IPS-mode LCD, when the residual DC appears, the residual DC is blocked by the static electricity protection pattern and cannot be emitted to the outside. That is, static electricity protection patterns are formed on the left and the right of the third common electrode line connected between the first and second common electrode lines. When static electricity generated from the outside flows into the LC panel along the first and second common electrode lines, the static electricity protection patterns are conducted to allow the static electricity to flow to the third common electrode line. At this point, since the static electricity protection pattern consists of a diode that allows current to flow in one direction only, the residual DC existing in the inside of the LC panel is blocked by the static electricity protection pattern and cannot be emitted to the outside properly.

The reason the residual DC exists on the third common electrode line has not been clearly examined. Since the residual DC is a primary factor that deteriorates image quality, it is important to remove the residual DC in order to achieve optimum image quality.

SUMMARY OF THE INVENTION

Accordingly, the present invention is directed to an LCD that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an LCD including: an LC panel for displaying an image; a first common electrode line and a second common electrode line vertically disposed at right and left of the LC panel; a third common electrode line connected between the first and second common electrode lines; gate lines disposed in parallel with the third common electrode line; and data lines disposed perpendicularly to the third common electrode line, wherein the third common electrode line has a static electricity protection pattern formed on one side thereof and has a predetermined conductive pattern formed on the other side thereof.

In another aspect of the present invention, there is provided an LCD including: an LC panel for displaying an image; a first common electrode line and a second common electrode line vertically disposed at right and left of the LC panel; a third common electrode line connected between the first and second common electrode lines; gate lines disposed in parallel with the third common electrode line; and data lines disposed perpendicularly to the third common electrode line, wherein the third common electrode line has a static electricity protection pattern formed on one side thereof and has a predetermined metal pattern formed on the other side thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 2:
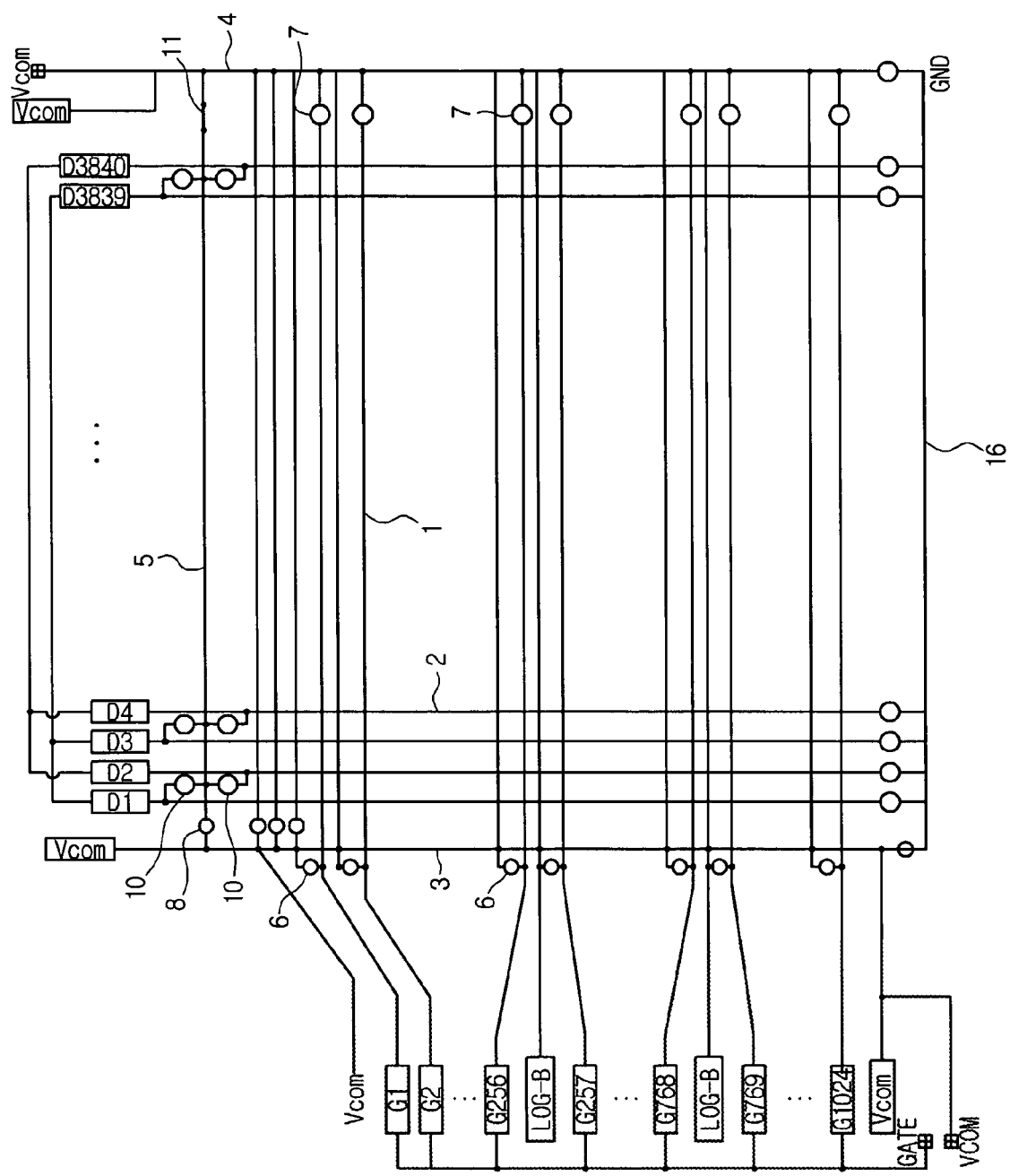
FIG. 2 is a schematic view of an array substrate of an LCD according to an embodiment of the present invention.

FIG. 2 is a schematic view of an array substrate of an LCD according to an embodiment of the present invention.

Referring to FIG. 2, the array substrate includes gate lines 1 arranged in the first direction and data lines 2 arranged in the second direction perpendicular to the first direction. A pixel region is defined by the gate lines 1 and the data lines 2.

A TFT serving as a switching device is connected with each of the gate lines 1 and the data lines 2. That is, a gate electrode of the TFT is connected with each of the gate lines 1 and a source electrode of the TFT is connected with each of the data lines 2. In the meantime, a drain electrode of the TFT is connected with a pixel electrode.

The LCD illustrated in FIG. 2 is limited to the IPS-mode LCD. In the IPS-mode LCD, the common electrode is formed on the array substrate together with the pixel electrode. The common electrode can have a line shape and be disposed in parallel with the gate lines 1. Pixel electrode bars, which are in parallel with the data lines 2, are arranged in the pixel electrode and common electrode bars alternately arranged relative to the pixel electrode bars are arranged in the common electrode. In that case, when a predetermined voltage is applied to the pixel electrode and the common electrode, a horizontal electric field (or transverse electric field) is generated between the pixel electrode bars and the common electrode bars. The LC is driven by this horizontal electric field to display an image. In the IPS-mode LCD, the displacement width of the LC is almost not limited and the viewing angle is wide.

In the meantime, common electrode lines 3, 4, and 5 for allowing a common voltage provide from the outside to be supplied to the common electrode are arranged along the edge of the LC panel. That is, the first common electrode line 3 is disposed at the left edge of the LC panel, the second common electrode line 4 is disposed at the right edge of the LC panel, and the third common electrode line 5 is disposed at the upper edge of the LC panel. The third common electrode line 5 is connected between the first common electrode line 3 and the second common electrode line 4. At this point, a ground line 16 for grounding is disposed at the lower side between the first and second common electrode lines 3 and 4 extending to the lower side of the left and right edges of the LC panel.

In the case where the common electrode lines 3, 4, and 5 are arranged as described above, the gate lines 1 arranged within the LC panel are connected with the first common electrode line 3 and with the first static electricity protection pattern 6 interposed. Also, the gate lines 1 are connected with the second common electrode line 4 and with the second static electricity protection pattern 7 interposed. Also, the fifth static electricity protection pattern 10 is provided to each point between the third common electrode line 5 and the data lines 2. Here, the static electricity protection patterns 6, 7, and 10 prevent the inside of the device from being damaged due to electrostatic discharge (ESD). The static electricity protection patterns 6, 7, 8 and 10 can consist of a transistor having a diode function that allows a current to flow in one direction only. That is, the static electricity protection patterns 6, 7, 8 and 10 swiftly emit static electricity generated in the inside of the LC panel to the outside and prevent static electricity generated at the outside from flowing into the inside of the LC panel. Accordingly, thanks to the static electricity protection patterns 6, 7, 8 and 10, the TFT or the pixel electrode provided within the LC panel can be safely protected.

Figure 1:
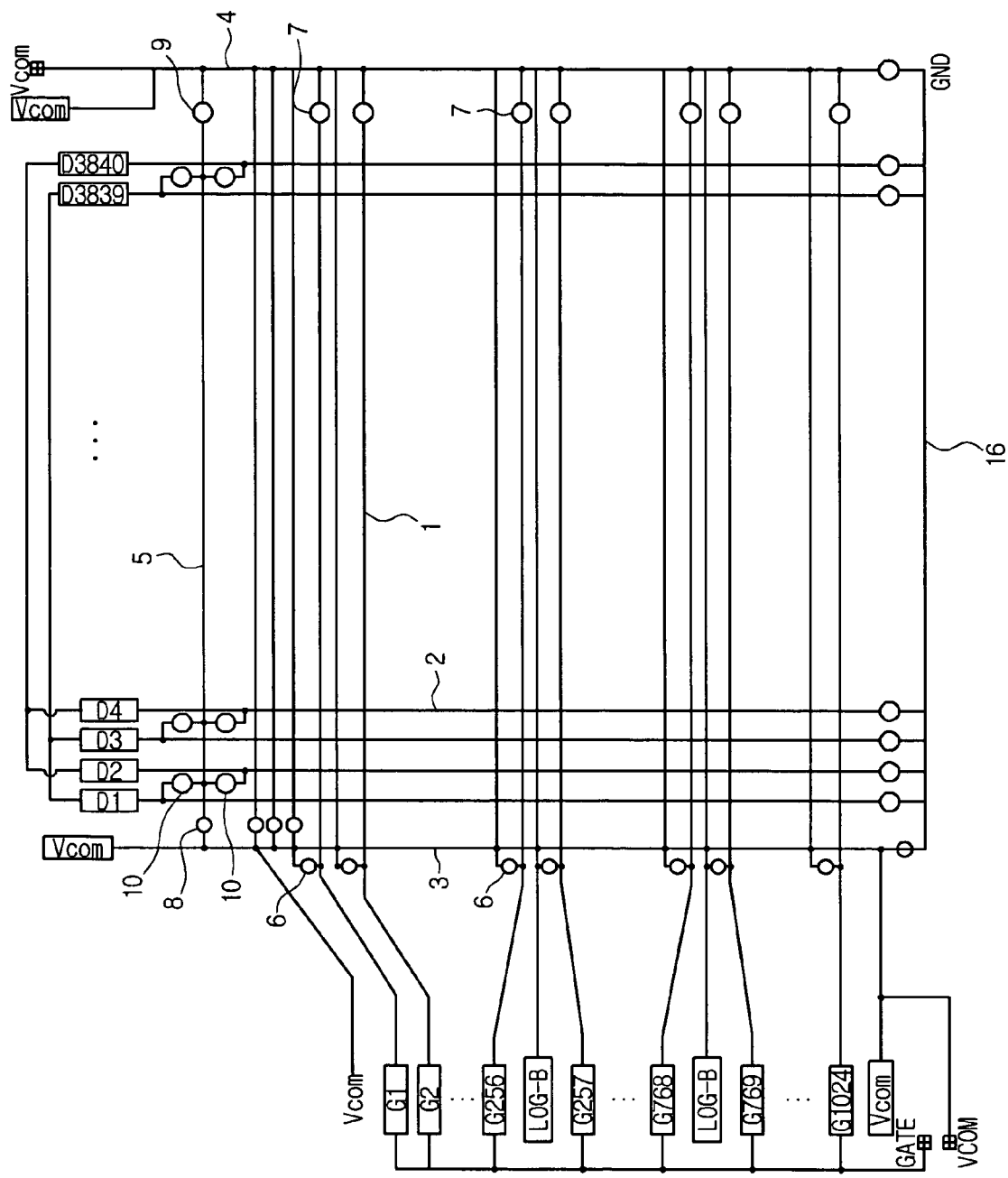
FIG. 1 is a schematic view of an array substrate of a related art LCD.

Particularly, the third static electricity protection pattern 8 can be formed at only one side of the third common electrode line 5 connected between the first common electrode line 3 and the second common electrode line 4. That is, referring to FIG. 1, the third and fourth static electricity protection patterns 8 and 9 have been formed at left and right of the third common electrode line 5, respectively. In that case, since the residual DC existing in the inside of the LC panel is blocked by the static electricity protection patterns 8 and 9, the residual DC cannot be emitted to the outside.

To solve this problem, the present invention forms the third static electricity protection pattern 8 at only one side of the third common electrode line 5. A predetermined conductive pattern 11 can be connected with the other side of the third common electrode line 5 instead of the fourth static electricity protection pattern 9. Therefore, the predetermined conductive pattern 11 is formed at a place from which the fourth static electricity protection pattern 9 has been removed and connected with the third common electrode line 5 instead. Here, the conductive pattern 11 may be formed of indium-tin-oxide (ITO).

As described above, the third static electricity protection pattern 8 is formed on one side of the third common electrode line 5 and the predetermined conductive pattern 11 is connected with the other side of the third common electrode line 5, so that the residual DC existing on the third common electrode line 5 can be emitted to the outside through the second common electrode line 4 by way of the conductive pattern 11. The residual DC can be removed when the power is off. That is, the power of the LCD is off, no voltage is applied through the gate lines 1, the data lines 2, and the common electrode lines 3, 4, and 5. In that case, the residual DC existing on the third common electrode line 5 can be emitted to the outside through the conductive pattern 11 and the second common electrode line 4 without any obstacle.

As described above, though the exact reason has not been yet examined, when the LCD operates, the predetermined residual DC exists on the third common electrode line 5. Since the third and fourth static electricity protection patterns 8 and 9 have been formed at both left and right of the third common electrode line 5 in the related art, the residual DC has been blocked by the third and fourth static electricity protection patterns 8 and 9 and has not been emitted to the outside. Accordingly, an afterimage or a flicker has occurred, which deteriorates image quality. On the contrary, the present invention forms the third static electricity protection pattern 8 on one side of the third common electrode line 5 and forms the predetermined conductive pattern 11 on the other side (i.e., the place from which the static electricity protection pattern has been removed) of the third common electrode line 5, so that the residual DC can be emitted through the conductive pattern 11 to the outside.

Figure 3:
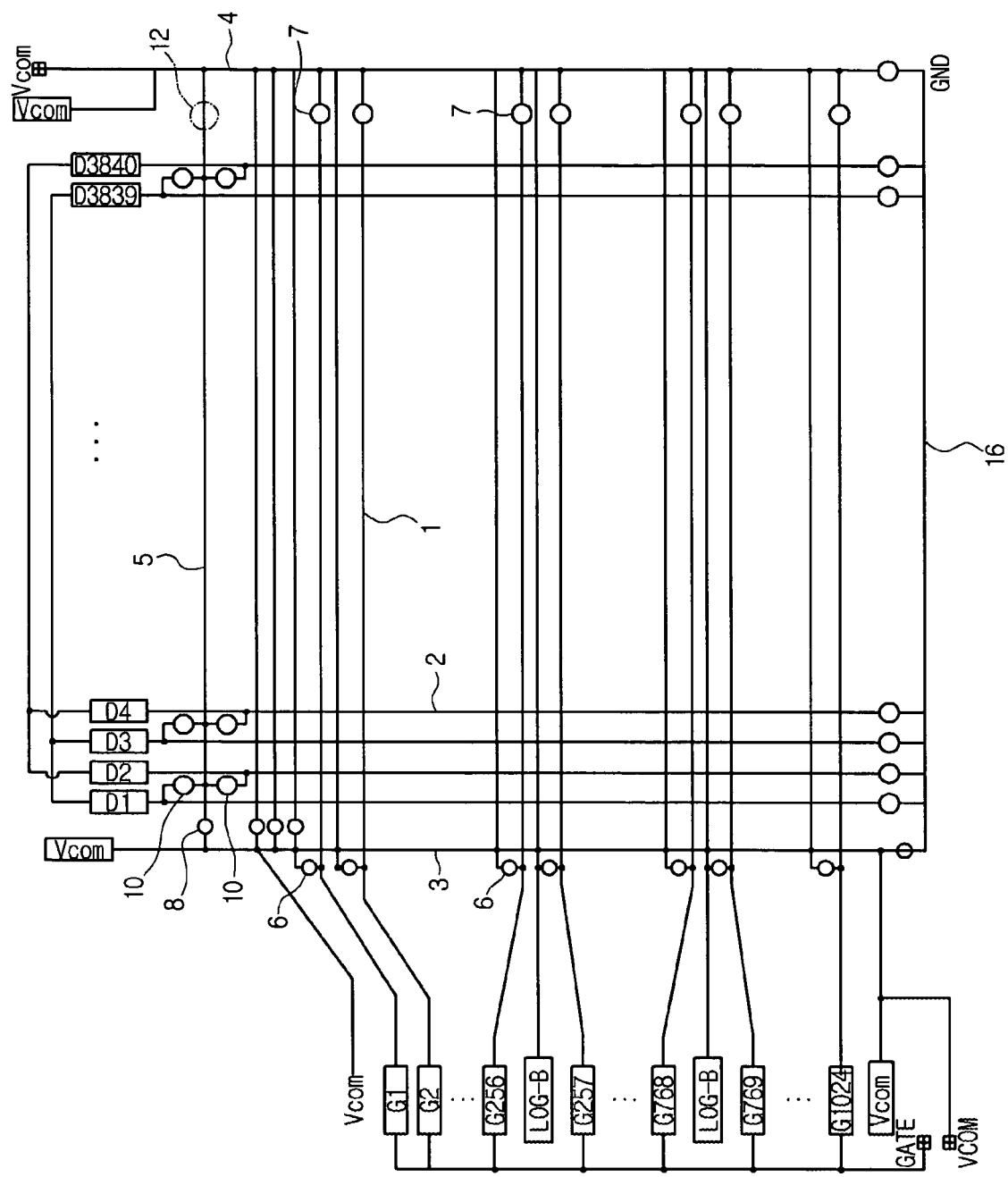
FIG. 3 is a schematic view of an array substrate of an LCD according to another embodiment of the present invention.

FIG. 3 is a schematic view of an array substrate of an LCD according to another embodiment of the present invention.

Referring to FIG. 3, the structure of the array substrate is the same as that of FIG. 2. However, in the array substrate illustrated in FIG. 3, the third static electricity protection pattern 8 is formed on one side of the third common electrode line 5 and a metal pattern 12 is integrally connected with the other side of the third common electrode line 5. The metal pattern 12 is present instead of a fourth static electricity protection pattern. The metal pattern 12 may be formed of the same material as the third common electrode line 5, therefore the metal pattern 12 may be the same as the third common electrode line 5.

Since the third and fourth static electricity protection patterns 8 and 9 have been formed at both left and right of the third common electrode line 5 in the related art, the residual DC existing on the third common electrode line 5 has been blocked by the third and fourth static electricity protection patterns 8 and 9 and has not been emitted to the outside. Accordingly, the present invention has the third static electricity protection pattern 8 at only one side of the third common electrode line 5 and integrally forms the metal pattern 12 made of the same material as the third common electrode line 5 on the other side of the third common electrode line 5. By forming the metal pattern 12, the residual DC existing on the third common electrode line 5 while the LCD operates, can be naturally emitted to the outside through the second common electrode line 4 by way of the metal pattern 12 opposite to the third static electricity protection pattern 8 when the power is off. Accordingly, the residual DC is removed, so that an afterimage or a flicker does not occur and thus image quality improves.

As is apparent from the foregoing, the present invention prevents an afterimage or a flicker by swiftly emitting the residual DC existing in the inside of the LC panel to the outside, and thus improves image quality.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LCD comprising: an LC panel displaying an image;
   a first common electrode line and a second common electrode line vertically disposed on the LC panel;
   a third common electrode line connected between the first and second common electrode lines;
   gate lines disposed on the LC panel in parallel with the third common electrode line;
   data lines disposed on the LC panel perpendicularly to the third common electrode line;
   a first static electricity protection pattern disposed in between the gate lines and the first common electrode line;
   a second static electricity protection pattern disposed in between the gate lines and the second common electrode line;
   a third static electricity protection pattern disposed in between the data lines and the third common electrode line,
   wherein the third common electrode line has a fourth static electricity protection pattern, a conductive pattern and first to third lines,
   wherein the first line is connected to the second line through the fourth static electricity protection pattern and the second line is connected to the third line through the conductive pattern.

2. The LCD according to claim 1, wherein the conductive pattern is made of indium-tin-oxide (ITO).

3. The LCD according to claim 1, wherein the static electricity protection patterns are an electrostatic discharge (ESD) circuit.

4. The LCD according to claim 1, wherein the fourth static electricity protection pattern allows a current to flow in one direction.

5. The LCD according to claim 1, wherein the static electricity protection patterns have a diode function.

6. The LCD according to claim 1, wherein the static electricity protection patterns comprise at least one transistor so as to have a diode function.

7. The LCD according to claim 1, wherein a residual DC existing in the third common electrode line is emitted to the outside of the LC panel by the conductive pattern.

8. The LCD according to claim 7, wherein the residual DC existing in the third common electrode line is emitted to the outside of the LC panel when a drive voltage is off.

9. An LCD comprising:
an LC panel displaying an image;
a first common electrode line and a second common electrode line vertically disposed on the LC panel;
a third common electrode line connected between the first and second common electrode lines;
gate lines disposed on the LC panel in parallel with the third common electrode line;
data lines disposed on the LC panel perpendicularly to the third common electrode line;
a first static electricity protection pattern disposed in between the gate lines and the first common electrode line;
a second static electricity protection pattern disposed in between the gate lines and the second common electrode line; and
a third static electricity protection pattern disposed in between the data lines and the third common electrode line,
wherein the third common electrode line has a fourth static electricity protection pattern, a metal pattern and first to third lines,
wherein the first line is connected to the second line through the fourth static electricity protection pattern and the second line is connected to the third line through the metal pattern.

10. The LCD according to claim 9, wherein the metal pattern is made of the same material as the third common electrode line.

11. The LCD according to claim 9, wherein the metal pattern is connected integrally with the third common electrode line.

12. The LCD according to claim 9, wherein the static electricity protection patterns are an electrostatic discharge (ESD) circuit.

13. The LCD according to claim 9, wherein the fourth static electricity protection pattern allows a current to flow in one direction.

14. The LCD according to claim 9, wherein the static electricity protection patterns have a diode function.

15. The LCD according to claim 9, wherein the static electricity protection patterns include at least one transistor to have a diode function.

16. The LCD according to claim 9, wherein a residual DC existing in the third common electrode line is emitted to the outside of the LC panel by the metal pattern.

17. The LCD according to claim 16, wherein the residual DC existing in the third common electrode line is emitted to the outside of the LC panel when a drive voltage is off.

18. A system for displaying an image on an LCD comprising:
a liquid crystal (LC) panel;
a first common electrode line disposed on the LC panel;
a second common electrode line disposed parallel to the first common electrode line on the LC panel;
a third common electrode line coupled perpendicularly with the first common electrode line and the second common electrode line;
gate lines disposed on the LC panel in parallel with the third common electrode line;
data lines disposed on the LC panel perpendicularly to the third common electrode line;
a first static electricity protection pattern disposed in between the gate lines and the first common electrode line;
a second static electricity protection pattern disposed in between the gate lines and the second common electrode line; and
a third static electricity protection pattern disposed in between the data lines and the third common electrode line,
wherein the third common electrode line has a fourth static electricity protection, a conductive pattern and first to third lines,
wherein the first line is connected to the second line through the fourth static electricity protection pattern and the second line is connected to the third line through the conductive pattern.

19. The system according to claim 18, wherein the conductive pattern is made of indium-tin-oxide (ITO).

20. The system according to claim 18, wherein the static electricity protection patterns are an electrostatic discharge (ESD) circuit.

21. The system according to claim 18, wherein the fourth static electricity protection pattern allows a current to flow in one direction.

22. The system according to claim 18, wherein the static electricity protection patterns have a diode function.

23. The system according to claim 18, wherein the static electricity protection patterns include at least one transistor to have a diode function.

24. The system according to claim 18, wherein the metal pattern is made of the same material as the third common electrode line.

25. The system according to claim 18, wherein the metal pattern is connected integrally with the third common electrode line.

26. The system according to claim 18, wherein a residual DC is emitted outside of the LC panel by the at least one of the conductive pattern, the metal pattern, or the combination thereof.

27. The system according to claim 26, wherein the residual DC is emitted outside of the LC panel when a drive voltage is off.

28. A system for displaying an image on an LCD comprising:
a liquid crystal (LC) panel;
a first common electrode line disposed on the LC panel;
a second common electrode line disposed parallel to the first common electrode line on the LC panel;
a third common electrode line coupled perpendicularly with the first common electrode line and the second common electrode line;
gate lines disposed on the LC panel in parallel with the third common electrode line;
data lines disposed on the LC panel perpendicularly to the third common electrode line;
a first static electricity protection pattern disposed in between the gate lines and the first common electrode line;
a second static electricity protection pattern disposed in between the gate lines and the second common electrode line; and
a third static electricity protection pattern disposed in between the data lines and the third common electrode line,
wherein the third common electrode line has a fourth static electricity protection pattern, a conductive pattern and first to third lines, wherein the first line is connected to the second line through the fourth static electricity protection pattern and the second line is connected to the third line through the conductive pattern.

29. The system according to claim 28, wherein the static electricity protection patterns are an electrostatic discharge (ESD) circuit.

30. The system according to claim 28, wherein the fourth static electricity protection pattern allows a current to flow in one direction.

31. The system according to claim 28, wherein the static electricity protection patterns have a diode function.

32. The system according to claim 28, wherein the static electricity protection patterns include at least one transistor to have a diode function.

33. The system according to claim 28, wherein a residual DC is emitted outside of the LC panel through a second side of the third common electrode line.

34. The system according to claim 28, wherein the third common electrode line has at least one of a conductive pattern, a metal pattern, or a combination thereof, located on the side of the third common electrode line opposite from the first side with the static electricity protection pattern.

35. The system according to claim 34, wherein the conductive pattern is made of indium-tin-oxide (ITO).

36. The system according to claim 34, wherein the metal pattern is made of the same material as the third common electrode line.

37. The system according to claim 34, wherein the metal pattern is connected integrally with the third common electrode line.

38. The system according to claim 34, wherein a residual DC is emitted outside of the LO panel by the at least one of the conductive pattern, the metal pattern, or the combination thereof.

39. The system according to claim 38, wherein the residual DC is emitted outside of the LC panel when a drive voltage is off.

* * * * *

UNITED STATES PATENT AND TRADEMARK OFFICE
CERTIFICATE OF CORRECTION

| | |
|---|---|
| PATENT NO. | : 7,525,607 B2 |
| APPLICATION NO. | : 11/167621 |
| DATED | : April 28, 2009 |
| INVENTOR(S) | : Deok Won Lee et al. |

It is certified that error appears in the above-identified patent and that said Letters Patent is hereby corrected as shown below:

<u>In the Claims</u>

In column 10, claim 38, line 13, after "emitted outside of the" delete "LO" and substitute --LC-- in its place.

Signed and Sealed this

Eleventh Day of August, 2009

David J. Kappos
*Director of the United States Patent and Trademark Office*